(12) United States Patent
Stein et al.

(10) Patent No.: US 12,312,116 B2
(45) Date of Patent: May 27, 2025

(54) SEALING ELEMENT

(71) Applicant: WATTTRON GmbH, Freital (DE)

(72) Inventors: Marcus Stein, Freital (DE); Sascha Bach, Freital (DE)

(73) Assignee: WATTTRON GmbH, Freital (DE)

( * ) Notice: Subject to any disclaimer, the term of this patent is extended or adjusted under 35 U.S.C. 154(b) by 124 days.

(21) Appl. No.: 18/025,407

(22) PCT Filed: Sep. 9, 2021

(86) PCT No.: PCT/EP2021/074867
§ 371 (c)(1),
(2) Date: Mar. 9, 2023

(87) PCT Pub. No.: WO2022/053586
PCT Pub. Date: Mar. 17, 2022

(65) Prior Publication Data
US 2023/0330944 A1  Oct. 19, 2023

(30) Foreign Application Priority Data
Sep. 9, 2020  (DE) .................... 10 2020 123 565.8

(51) Int. Cl.
*B65B 51/14* (2006.01)
*B29C 65/30* (2006.01)
*B29C 65/82* (2006.01)
*B29L 31/00* (2006.01)
*B65B 51/10* (2006.01)

(52) U.S. Cl.
CPC .............. *B65B 51/14* (2013.01); *B29C 65/30* (2013.01); *B29C 65/8276* (2013.01); *B29L 2031/712* (2013.01); *B65B 2051/105* (2013.01)

(58) Field of Classification Search
CPC ...................................................... B65B 51/14
See application file for complete search history.

(56) References Cited

U.S. PATENT DOCUMENTS

2021/0276755 A1* 9/2021 Bach .................... B29C 66/232

FOREIGN PATENT DOCUMENTS

| CN | 110573967 B | * | 10/2020 |
| ES | 2354540 B1 | * | 1/2012 |
| WO | WO-2018/055034 A1 | * | 3/2018 |

* cited by examiner

*Primary Examiner* — Jeffry H Aftergut
(74) *Attorney, Agent, or Firm* — Soquel Group LLC

(57) ABSTRACT

Embodiments of the invention relate to a sealing element for thermally joining thermoplastic materials along a bent or cambered contour, including a plurality of heating elements which each has a flat carrier substrate with a front and a rear side, at least one heating circuit being disposed on the front side, and at least one contour element which has a bent or cambered contour, the heating elements being disposed on the contour element.

11 Claims, 6 Drawing Sheets

SEALING ELEMENT

CROSS-REFERENCE TO RELATED APPLICATIONS

This application claims benefit under 35 USC § 371 of PCT Application No. PCT/EP2021/074867 entitled SEALING ELEMENT, filed on Sep. 9, 2021 by inventors Marcus Stein and Sascha Bach. PCT Application No. PCT/EP2021/074867 claims priority of German Patent Application No. 10 2020 123 565.8, filed on Sep. 9, 2020.

FIELD OF THE INVENTION

The invention relates to improvements to sealing elements.

BACKGROUND OF THE INVENTION

Herein, the term "sealing" is the integrally joined connection, in particular of plastics, primarily for the production of packagings from thermoplastic materials such as plastic films or film composites such as, for example, plastic films which are coated with metallic and non-metallic materials, metal foils such as aluminum foil and the like which are coated with a thermoplastic, for example during the production of tubular bags, the closure of containers, for example by welding plastic film with or without aluminum coating, plastic-coated aluminum foil or other thermally weldable materials onto containers made from plastic with or without a coating or made from aluminum with a plastic coating, or the sealing/welding of films or film composites of the abovementioned type.

In the case of sealing, heated sealing tools (also called sealing elements) are usually used. They consist as a rule of a heating cartridge (wound resistance conductor) and a main body, into which the heating cartridge and a temperature sensor required for the closed-loop temperature control are integrated.

WO 2018/055034 A1 describes a sealing element, in the case of which heat-generating elements of a heating element are contacted from its rear side. Further aspects relate to a sealing element, in the case of which the location of the heat generation and the location of the heat dissipation (that is to say, the active location) are arranged as close to one another as possible, to a heating element which is an integrated temperature sensor, and to a sealing element with the possibility as required of cooling or attracting by suction the heating element and/or the material to be welded.

Known sealing elements, for example what are known as sealing jaws, usually have a planar contact surface. Exceptions are what are known as sealing wheels, the circular outer contour of which is heated. This outer contour does not correspond, however, with the shape of the material to be sealed, but rather serves to roll the round sealing wheel continuously on the material which is planar per se, in order in this way to continuously produce a sealed seam, for example during the production of tubular bags, while these are pulled off from a shaping collar.

SUMMARY OF THE INVENTION

There are different applications, however, in the case of which a three-dimensionally shaped structure has to be sealed. One example for this is what are known as "spout bags", that is to say bags of a very wide variety of types which are provided with a reclosing means which can be screwed on. The "spout" is a plastic injection molded part here which provides a spout with thread which can be opened and closed by way of a screw cap. The "spouts" are predominantly used either in an upper corner (for example, personal care products, cleaning agents) or in the middle of the upper boundary of the bags (for example, beverage, fruit puree), depending on the application and/or product.

The maximum thickness of the spout is determined by the outer diameter of the pourer. In order for it to be possible for this pourer to be sealed in between two film layers, the plastic injection molded part has a thickness which decreases toward the two sides starting from the greatest thickness in the center of the spout, with the result that the two films can be sealed directly to one another smoothly on the other side of the spout. The contour to be sealed is therefore shaped three-dimensionally, because the surfaces of the spout to be sealed are arched, that is to say single-curved.

The core concept of the present invention is formed by the segmented, mosaic-like arrangement and electric connection of heating elements for heating three-dimensional surfaces, it being possible for the heating to take place with or without contact (by means of radiant heat/convective heat).

The invention provides a sealing element which is capable of discontinuously producing both planar and three-dimensional sealed seams, that is to say, for example, of sealing a workpiece with single-curved (that is to say, arcuate) or else double-curved (that is to say, arched) outer contours, for example of welding on a film or of welding the workpiece in between two films.

In one refinement, the proposed sealing element for thermally connecting thermoplastic materials along an arcuate or arched contour comprises a plurality of heating elements which each have a flat carrier substrate with a front side and a rear side, on the front side of which at least one heating circuit is arranged, and further comprises at least one contour element which has an arcuate or arched contour, the heating elements being arranged on the contour element.

In this context, the term "flat" means, for example, "in the form of a small plate", it being possible for the small plate to be planar or arcuate or arched. The particular advantage of the invention comes into effect if planar heating elements which are relatively small in terms of their dimensions and can be produced simply are combined with one another in such a way that a complex, arcuate or arched seal contour is produced in the combination of a multiplicity of heating elements of this type.

In the simplest case, a carrier substrate contains precisely one heating circuit which is produced, for example, in a thin film coating method from metal or in a thick film printing method from conductive paste or conductively prepared ceramic slurry. It goes without saying, however, that the concept of the invention likewise includes refinements, in the case of which two or more heating circuits are arranged on one carrier substrate. It can advantageously be provided that the heating elements can be actuated individually. It can particularly advantageously be provided that each individual heating circuit can be actuated with regard to its heating performance or the target temperature separately from all the other heating circuits, even those which are situated on the same carrier substrate.

According to one refinement, the sealing element has an open-loop or closed-loop control device or can be connected to an open-loop or closed-loop control device, which enables the separate individual actuation or closed-loop control of all the heating circuits. An open-loop or closed-loop control device of this type can be arranged in a housing of the sealing element either on its own or together with an electronic power system. As an alternative, the electronic power system can also be a constituent part of a packaging machine, the sealing element being used as a component thereof when the sealing element is connected to the electronic power system of the packaging machine.

In accordance with another refinement, the heating circuits of the heating elements are contacted through the respective carrier substrate from the rear side of the carrier substrates. As an alternative or in addition, it can be provided that the open-loop or closed-loop control device is connected to the heating circuits of the heating elements by way of a flexible printed circuit board, by way of which the heating circuits of the heating elements are contacted electrically. A combination of these two refinements results in an embodiment, in the case of which a flexible printed circuit board has conductor tracks which lead from an open-loop or closed-loop control device and/or an electronic power system to all the heating elements and contacts the heating circuits of the latter from the rear side of the respective carrier substrates. To this end, the carrier substrates can comprise, for example, VIAs (Vertical Interconnect Access), that is to say conducting plated-through holes. Moreover, the flexible printed circuit board can have, in the region of the VIAs, what are known as landing pads (contact islands) which can be connected, for example, by way of soldering, bonding, adhesive bonding using a conductive adhesive, ultrasonic welding or other suitable contacting methods to contact points which are arranged on the rear side of the carrier substrates.

Moreover, the flexible printed circuit board simplifies the universal use of an arrangement of heating elements produced in this way, by the heating elements which are connected to one another in a flexible manner by way of the printed circuit board being attached as required to another contour element, the front side of which has a different contour to be sealed. In accordance with a further refinement, the heating elements and, if present, the front-side second contour element are covered by way of a covering element, the front side of which has the contour to be sealed. The covering element can consist, for example, of an electrically non-conducting material, in order to avoid short-circuits and at the same time to provide an abrasion protection layer to the sealing element. If the heating elements are fastened by way of their front side to the rear side of a second contour element, the second contour element can also as an alternative at the same time assume the function of the covering element.

The proposed sealing member can comprise, for example, a plurality of small (for example, between 2 mm×2 mm and 20 mm×20 mm), flat, rectangular, square or differently shaped heating elements which in each case comprise at least one heating circuit and advantageously an integrated option for temperature measurement. The heating elements can consist, for example, of printed ceramic, metallic or plastic-based carrier substrates.

The arrangement of the heating elements can take place, for example, in a mosaic-like manner in accordance with a three-dimensional structure to be heated. To this end, elements of different size can be combined in the mosaic, in order to achieve as exact (step-like) production of the three-dimensional contour as possible.

In the case of heating with contact, the heating elements can additionally be coupled thermally to a metallic heat exchanger (for example, a sealing profiled sheet) which represents a negative of the three-dimensional surface to be heated.

The electric contacting can take place, for example, by means of a flexible foil cable (for example, made from polyimide) in the manner of a "pearl necklace". The electric connection between the flexible foil cable and the heating elements can take place, for example, by means of soldering, sintering or welding. Moreover, the flexible foil cable which is used can comprise a rigid component (what is known as rigid-flexible).

To this end, heating elements are contacted electrically in a planar arrangement and are subsequently arranged along the correspondingly shaped sealing profiled sheet rear side (in accordance with the contour to be sealed) and contacted thermally. The electric contacting of the heating elements preferably takes place on the rear side of the heating elements, as a result of which a best possible homogeneity of the surface temperature on the active side can be ensured.

For fixing purposes, a first contour element can be attached as carrier structure on the rear side in an integrally joined manner, for example by way of welding, soldering or sintering, or in a non-positive manner, for example by way of being pressed or clamped on, via which contour element the force is also transmitted and the heating elements are encapsulated as a result. As a result, the heating elements are not in the force flow.

The second contour element (for example, a profiled sheet) which is situated between the heating element and the three-dimensional surface to be heated can have, for example, a maximum thickness of 1.5 mm (maximum spacing between the heating elements and the profile surface) and can subsequently be machined (for example, by way of milling, turning, grinding or the like) for the exact reproduction of the three-dimensional surface.

The (for example, metallic) material which is used for the second contour element has a high coefficient of thermal conductivity (>100 W/m*K).

In the case of contactless (radiant) heating, the front-side second contour element can be dispensed with, and the heating elements can be introduced into high-temperature-resistant insulation materials in an integrally joined manner on the rear side, for example.

The electric contacting of the heating elements can take place, for example, by means of welded-on wires, welded-on, soldered or sintered contact pins or the like. The electric contacting can take place both on the front side (active side) and on the rear side of the heating elements.

Furthermore, the overall assembly can comprise an insulating body made from thermally insulating material between the heating element and the housing. The housing can consist of metallic or thermally insulating material.

The sealing elements which are characterized by a multiplicity (at least two) of individual heating elements have a correspondingly multiple-channel open-loop or closed-loop control device and temperature measurement. They are preferably integrated into the housing of the assembly. If the installation space and use conditions do not allow this, this open-loop or closed-loop control device can also be positioned in a separate housing at a corresponding spacing from the heating elements.

The heating elements can advantageously have both the function of resistive heating and resistive temperature measurement. To this end, the (only) heating circuit which is arranged on the carrier substrate of a heating element can itself be utilized directly for temperature measurement, by it having a sufficient temperature-dependent heating resistance. As an alternative or in addition, a separate measurement line can be arranged on the carrier substrate of the heating element, which measurement line has a high (>1000 ppm/K) temperature-dependent resistance.

BRIEF DESCRIPTION OF THE DRAWINGS

In the following text, exemplary embodiments of the proposed sealing element will be explained in greater detail on the basis of figures of the drawing, in which.

DETAILED DESCRIPTION OF EMBODIMENTS

Figure 1:
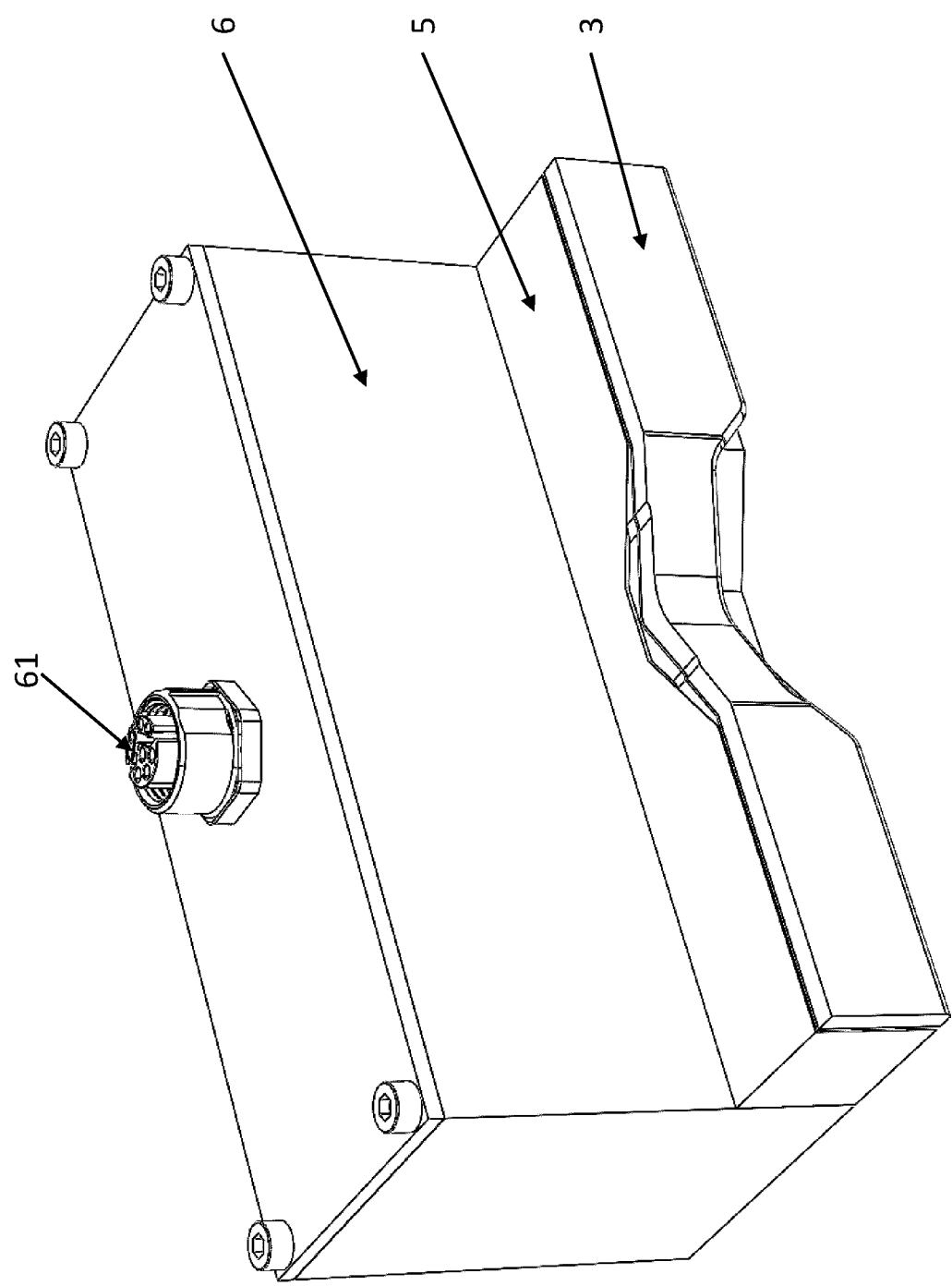
FIG. 1 shows a first exemplary embodiment of the sealing element without a cooling device.
Figure 2:
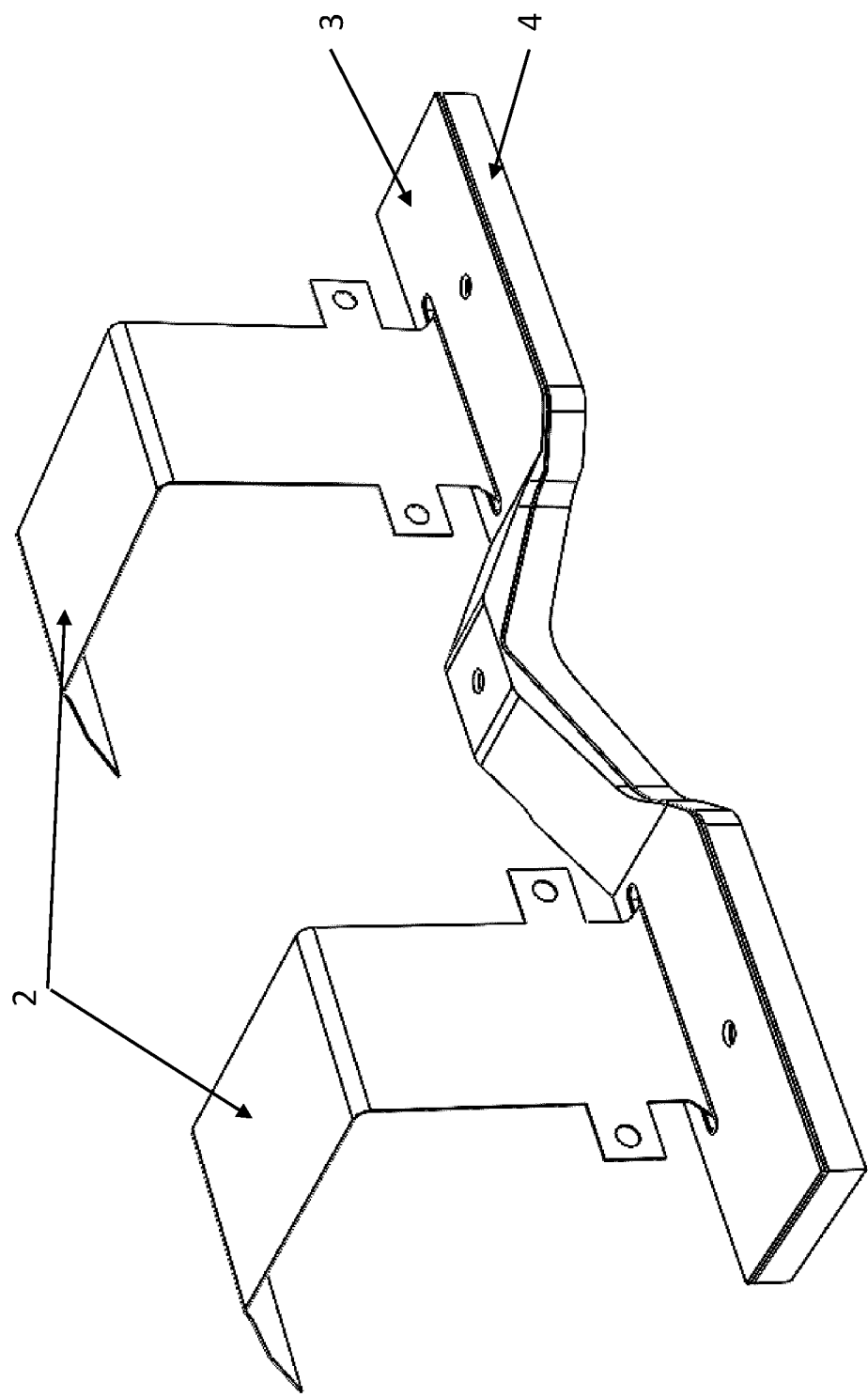
FIG. 2 shows the heater assembly from FIG. 1.
Figure 3:
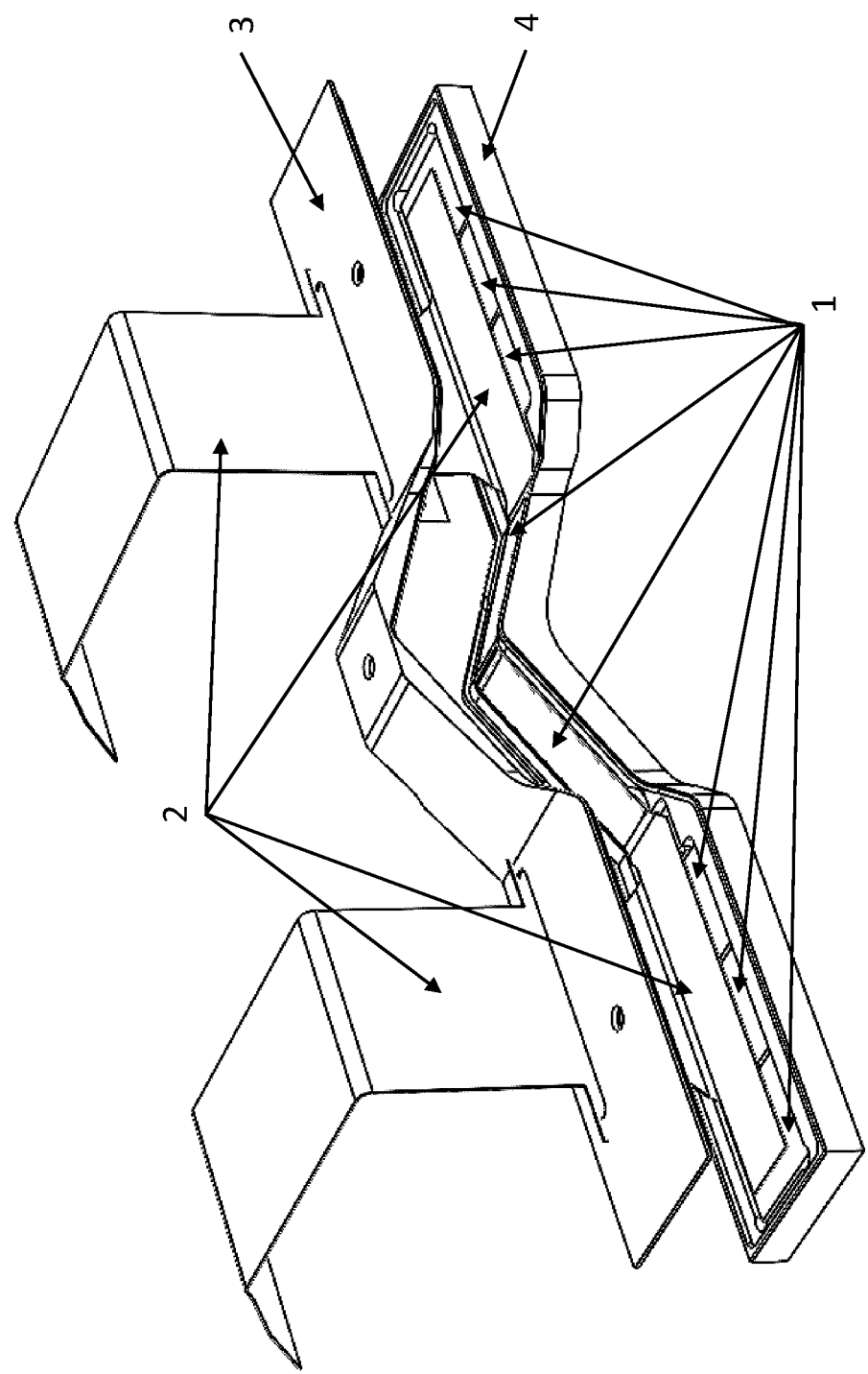
FIG. 3 shows an exploded illustration of the heater assembly from FIG. 2.
Figure 4:
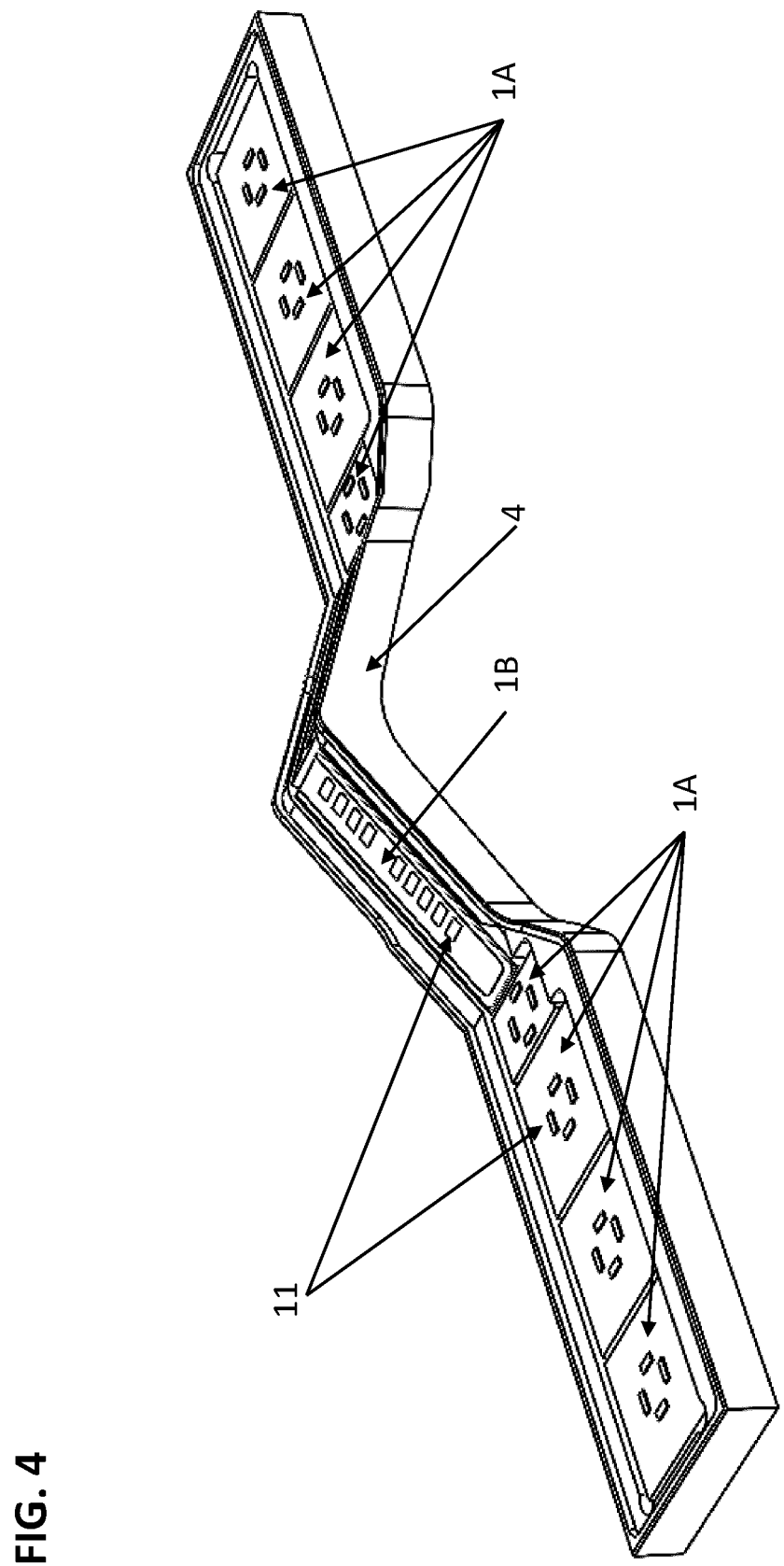
FIG. 4 shows the arrangement of the heating elements in the heater assembly from FIGS. 2 and 3.

FIGS. 1 to 4 relate to a first exemplary embodiment of the proposed sealing element, in the case of which an insulating body 5 which acts at the same time as a supporting element for a heater module is attached to a housing 6 by way of a plug-in connector 61.

The heater module comprises a first contour element 3 which acts at the same time as a carrier structure for the heating elements, and a second contour element 4 which serves at the same time as a covering structure for the heating elements. Here, the first contour element 3 can be configured from the same material as the second contour element 4 and can be connected to the latter in an integrally joined manner (for example, welded or soldered).

An arrangement of heating elements which each comprise a carrier substrate 1 is enclosed and encapsulated between the first contour element 3 and the second contour element 4, the carrier substrates 1 comprising at least one heating circuit each on their front side.

There are carrier substrates 1A which each comprise precisely one heating circuit in the two end regions of the arrangement of heating elements. There are carrier substrates 1B which each comprise a plurality of heating circuits in the central region which supports an arcuate contour.

On their rear sides, the carrier substrates 1 have contact islands 11, by way of which the heating circuits which are arranged on the front side of the carrier substrate are contacted electrically. To this end, corresponding conductor structures of a flexible printed circuit board 2 are connected to the contact islands 11. The heating circuits are contacted electrically by means of plated-through holes from the rear side of the carrier substrate 1 through the latter.

To this end, the carrier substrates 1 of the heating elements have plated-through holes, what are known as VIAs, which are connected to the heating elements on the front side of the carrier substrates 1. A flexible printed circuit board 2 with conductor tracks for contacting each individual heating element extends over the rear side of the entire arrangement of carrier substrates 1, and the conductor tracks which are arranged thereon are connected electrically to the VIAs. The flexible printed circuit board 2 connects all the carrier substrates 1 to one another mechanically, the flexibility of the printed circuit board 2 leading to the entire arrangement of carrier substrates 1 being flexible and being adaptable to a three-dimensional contour as a result.

The rear-side first contour element 3 is connected by means of a supporting element 5 to a housing 6, in which, for example, an open-loop or closed-loop control device can be arranged. Here, this open-loop or closed-loop control device can switch to and fro, for example, continuously between heating operation, in which the heating element is loaded with heating energy, and temperature measuring operation, in which the resistance of the heating element which is variable in a temperature-dependent manner is determined. As a result, it becomes possible for the heating energy which is fed to each heating circuit to be closed-loop controlled in such a way that either all the heating circuits reach the same temperature (homogeneous temperature distribution) or different heating circuits reach different temperatures (heterogeneous temperature distribution).

Figure 5:
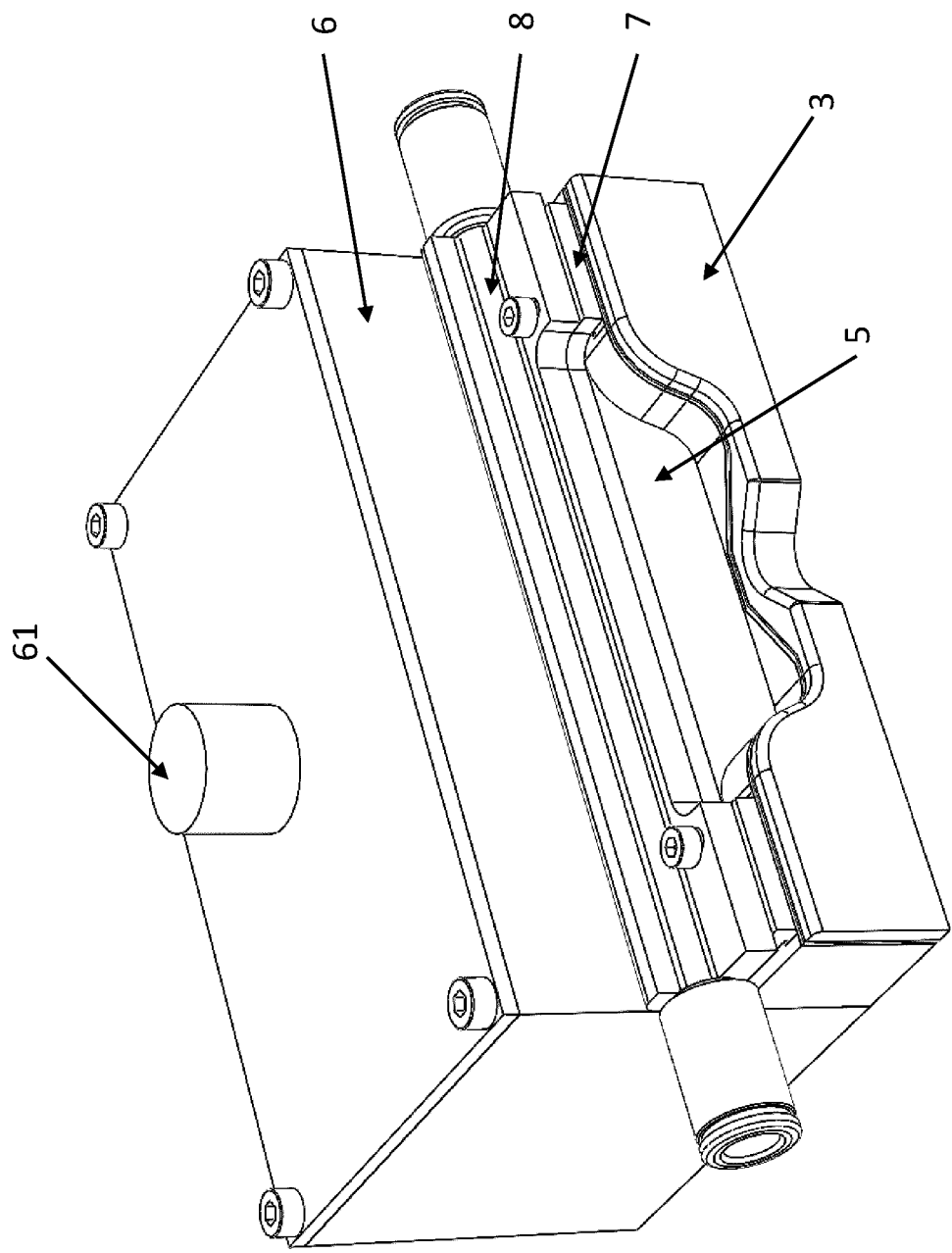
FIG. 5 shows a second exemplary embodiment of the sealing element with a cooling device.
Figure 6:
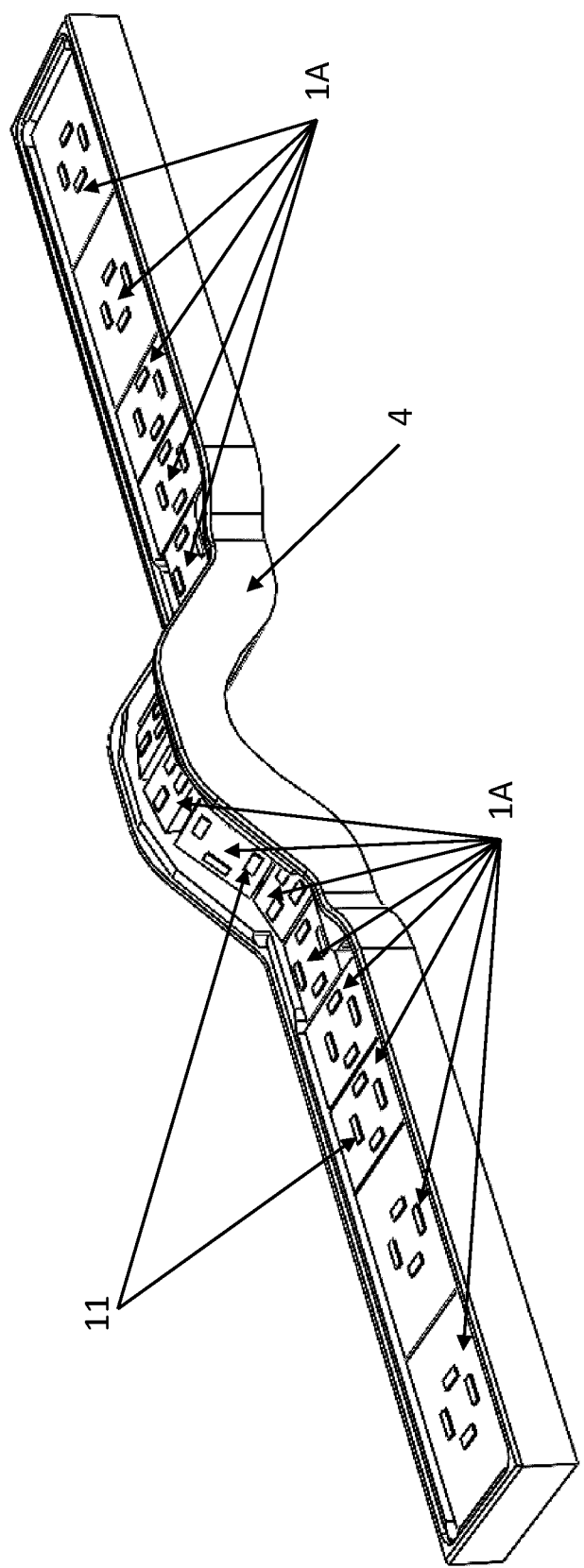
FIG. 6 shows the arrangement of the heating elements in the heater assembly from FIG. 5.

FIGS. 5 and 6 relate to a second exemplary embodiment of the proposed sealing element which is in principle constructed like the first exemplary embodiment, with the result that reference can be made in this regard to the above description. There are the following differences, however:

The heating elements which are used in this exemplary embodiment are all of the type, in the case of which precisely one heating circuit is arranged on one carrier substrate 1A. In contrast to the first exemplary embodiment, there are no heating elements here, in the case of which one carrier substrate carries a plurality of heating circuits. As in the first exemplary embodiment, the contacting of the heating elements takes place by way of a flexible printed circuit board 2 which is connected to contact islands 11 on the rear side of the carrier substrates 1.

In this exemplary embodiment, moreover, the sealing element has a cooling device which comprises a heat dissipation body 7 which is connected to an actively operated fluid cooling unit. It can be provided, for example, that the rear-side first contour element 3 is configured at the same time as a heat dissipation body 7. To this end, the first contour element 3 can comprise, for example, coolant ducts. As an alternative, as is shown in FIG. 5 for this exemplary embodiment, a separate heat dissipation body 7 (for example, a shaped metal sheet or a correspondingly milled component) can be arranged on the rear side of the first contour element 3. Here, the heat dissipation body can be attached to the first contour element 3 in such a way that the heat flow between the spout region which is as a rule operated at a higher temperature and the two flat end regions of the seal, in which only the films are sealed onto one another on both sides of the spout, is reduced. In the exemplary embodiment, the heat dissipation body 7 has an angled profile, the one limb of which is configured only in the two end regions of the heater module, where the two brackets which are formed as a result by this limb of the angled profile engage behind the first contour element and absorb its heat there. In the exemplary embodiment of FIG. 5, furthermore, the cooling device comprises a cooling element 8 which is in a thermally conducting connection to the second limb of continuous configuration of the heat dissipation body 7 and which has coolant connectors, via which the cooling element 8 is supplied from a cooling unit (not shown) with coolant which transports away the heat transmitted to the cooling element 8 by the heat dissipation body 7. As a result, a sharp temperature delineation within the contour element and therefore the seal surface of up to over 50 K is enabled.

LIST OF DESIGNATIONS

1 Carrier substrate
1A Carrier substrate with a heating circuit

1B Carrier substrate with a plurality of heating circuits
11 Contact island
2 Flexible printed circuit board
3 First contour element, carrier structure
4 Second contour element, cover structure
5 Insulating body, supporting element
6 Housing
61 Plug-in connector
7 Heat dissipation body
8 Cooling element

The invention claimed is:

1. A sealing element for thermally connecting thermoplastic materials along an arcuate or arched contour, comprising:
   a plurality of heating elements which each comprises a respective flat carrier substrate comprising a front side and a rear side, on the front side of which at least one heating circuit is arranged, the heating elements being arranged three-dimensionally so as to correspond to a three-dimensional contour to be sealed; and
   at least one contour element comprising an arcuate or arched contour, said heating elements being arranged on the at least one contour element.

2. The sealing element as claimed in claim 1, wherein said heating elements are produced in a thick film printing method from conductive paste or conductively prepared ceramic slurry.

3. The sealing element as claimed in claim 1, wherein said heating elements are produced in a thin film coating method from metal.

4. The sealing element as claimed in claim 1, further comprising an open-loop or closed-loop control device, or connected to an open-loop or closed-loop control device, wherein each heating element may be actuated with regard to heating performance or with regard to a target temperature, separately from other heating elements.

5. The sealing element as claimed in claim 1, wherein said heating elements are contacted electrically by means of a flexible printed circuit board.

6. The sealing element as claimed in claim 5, wherein the electric contacting takes place by way of sintering, soldering, bonding, adhesive bonding using a conductive adhesive, or ultrasonic welding.

7. The sealing element as claimed in claim 1, wherein said heating circuits are contacted electrically through the respective carrier substrates from the rear side of the carrier substrates.

8. The sealing element as claimed in claim 1, wherein said carrier substrates with the heating circuits attached on them are encapsulated between a rear-side first contour element, which acts as a carrier structure, and a front-side second contour element, which acts as a cover structure.

9. The sealing element as claimed in claim 1, further comprising a cooling device comprising a heat dissipation body which is connected to a cooling unit.

10. The sealing element as claimed in claim 9, wherein a first contour element is at the same time configured as a heat dissipation body.

11. The sealing element as claimed in claim 9, wherein a separate heat dissipation body is arranged on a first contour element.

* * * * *